(12) United States Patent
Domo et al.

(10) Patent No.: US 8,444,210 B2
(45) Date of Patent: May 21, 2013

(54) DRAG REDUCING APPARATUS FOR A VEHICLE

(75) Inventors: James Francis Domo, Chagrin Falls, OH (US); Patrick Edward Ryan, Auburn Township, OH (US)

(73) Assignee: Aerodynamic Trailer Systems, LLC, Aurora, OH (US)

( * ) Notice: Subject to any disclaimer, the term of this patent is extended or adjusted under 35 U.S.C. 154(b) by 31 days.

(21) Appl. No.: 12/886,756

(22) Filed: Sep. 21, 2010

(65) Prior Publication Data

US 2011/0068603 A1 Mar. 24, 2011

Related U.S. Application Data

(60) Provisional application No. 61/244,944, filed on Sep. 23, 2009.

(51) Int. Cl.
 *B62D 37/02* (2006.01)
 *B62D 35/00* (2006.01)

(52) U.S. Cl.
 USPC .................. 296/180.4; 296/180.1; 296/181.5; 180/903

(58) Field of Classification Search
 USPC ....... 296/180.1, 180.2, 181.5, 180.4; 180/903
 See application file for complete search history.

(56) References Cited

U.S. PATENT DOCUMENTS

| | | | |
|---|---|---|---|
| 4,006,932 A | 2/1977 | McDonald | |
| 4,601,508 A | 7/1986 | Kerian | |
| 4,702,509 A | 10/1987 | Elliott | |
| 4,741,569 A | 5/1988 | Sutphen | |
| 4,978,162 A | 12/1990 | Labe | |
| 5,236,347 A | 8/1993 | Andrus | |
| 5,375,903 A | 12/1994 | Lechner | |
| 5,498,059 A | 3/1996 | Switlik | |
| 5,823,610 A | 10/1998 | Ryan | |
| 5,832,610 A | 11/1998 | Chaplick | |
| 6,092,861 A | 7/2000 | Whelan | |
| 6,257,654 B1 | 7/2001 | Boivin | |
| 6,321,659 B1 | 11/2001 | Gelbert et al. | |
| 6,409,252 B1 * | 6/2002 | Andrus | 296/180.4 |
| 2003/0205913 A1 | 11/2003 | Leonard | |
| 2006/0103167 A1 | 5/2006 | Wong | |
| 2007/0046066 A1 | 3/2007 | Cosgrove et al. | |
| 2007/0176465 A1 | 8/2007 | Wood | |
| 2008/0061598 A1 | 3/2008 | Reiman et al. | |
| 2009/0200834 A1 | 8/2009 | Vogel et al. | |
| 2010/0181799 A1 | 7/2010 | Ryan et al. | |

FOREIGN PATENT DOCUMENTS

EP 1905674 A1 * 4/2008

OTHER PUBLICATIONS

International Search Report Dated Aug. 6, 2008.

* cited by examiner

*Primary Examiner* — Glenn Dayoan
*Assistant Examiner* — Melissa A Black
(74) *Attorney, Agent, or Firm* — Fay Sharpe LLP

(57) ABSTRACT

The present disclosure provides for drag reduction on a moving object through the atmosphere, thus increasing fuel efficiency. This is accomplished by attaching an inflatable boattail (i.e. drag reducer) to the aft face or rear end of a vehicle or trailer, thus delaying the flow separation to a point further downstream and mitigating the intensity of the negative pressure on the aft face.

14 Claims, 17 Drawing Sheets

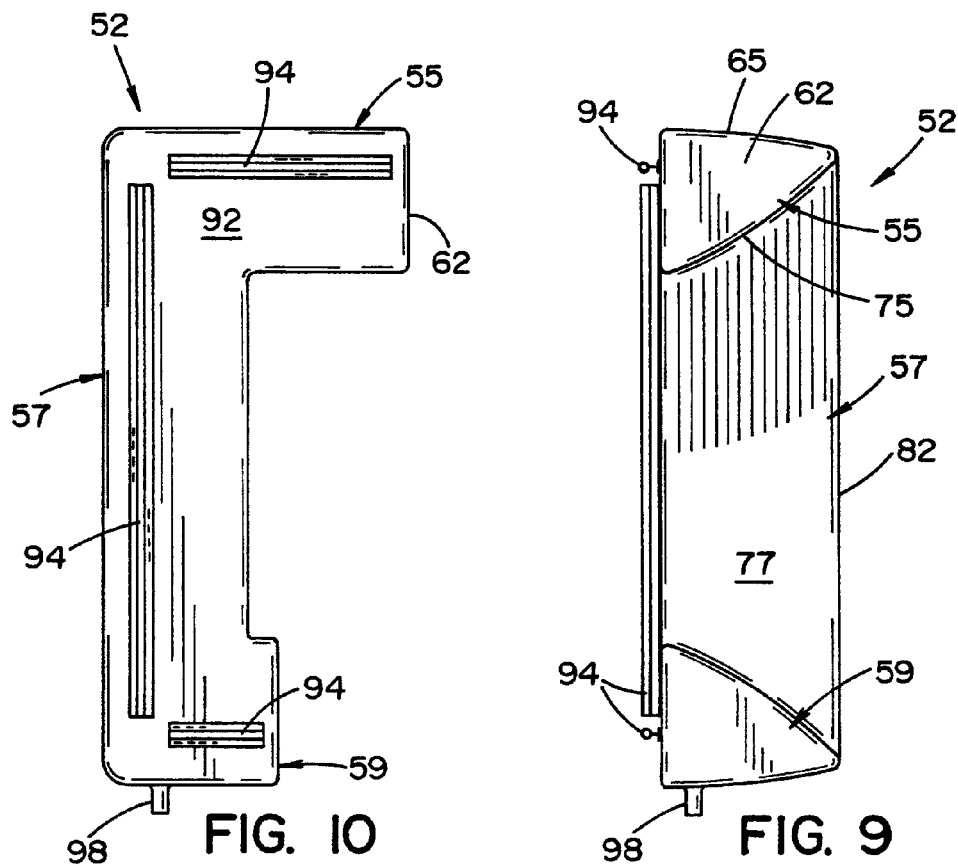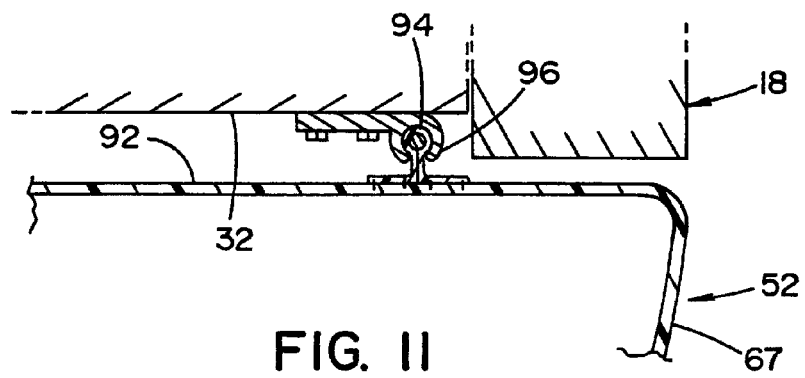

DRAG REDUCING APPARATUS FOR A VEHICLE

This application claims the priority benefit of U.S. provisional application Ser. No. 61/244,944, filed Sep. 23, 2009, the disclosure of which is incorporated herein by reference.

BACKGROUND

Various devices are currently known to increase the aerodynamic efficiency of a truck, semi trailer, or other large moving object. It has long been recognized that the rectangular high profile shape of these vehicles and the speeds necessary for travel increase aerodynamic drag. Reducing aerodynamic drag will significantly reduce overall fuel consumption and harmful air emissions. The present disclosure relates to add-on inflatable air deflectors for the rear surface or aft face of a transport trailer, for example, air deflector boattails that can be mounted to trailers that use swing or roll-up doors on a box van or other trailers which typically operate at speeds routinely in excess of 35 mph.

Inflatable drag reducers have been described (e.g. McDonald (1977) U.S. Pat. No. 4,006,932, Ryan (1998) U.S. Pat. No. 5,823,610, Andrus (2002) U.S. Pat. No. 6,409,252), and are more practical than rigid versions (e.g. Lechner (1994) U.S. Pat. No. 5,375,903, Switlik (1996) U.S. Pat. No. 5,498,059, Boivin (2001) U.S. Pat. No. 6,257,654 B1), because inflatables are light-weight and can be collapsible to a very thin state so as not to interfere with complete trailer door opening which is important because of the limited room to maneuver at most loading docks. However, given that the majority of standard long-haul box van transport trailers are typically a double door (i.e. swing door) configuration, it is beneficial to have a drag reducer with two separate portions (i.e. a separate portion associated with each door). Additionally, the two separate portions should, as a coordinated unit, provide beneficial drag reduction. Alternatively, drag reducers should also accommodate single doors, i.e. rollup doors, having a single continuous opening spanning the rear of the trailer.

It is of course well known that the box shape of trailers of tractor-trailer vehicle combinations, and other truck-trailer combinations, is the result of a need to optimize cargo space therewithin, and it is likewise well known that the boxlike configuration is not aerodynamically efficient. The aerodynamic drag resulting from the box shape accounts for a considerable percentage of the fuel consumption of large trucks and tractor-trailer vehicle combinations during highway operation thereof. In an effort to improve the operating efficiency of such vehicles, the tops of the cabs of trucks and tractors and the upper forward edges of both the tractor and trailer have been streamlined by using a wide variety of body contours and wind or air foil devices. Air foils mounted on the cabs of trucks and trailers can be rigid and permanent in character in that the areas on which the air foils are mounted typically do not need to be accessed in connection with use or operation of the vehicle. On the other hand, the rear ends of trailers do have to be accessible in that they are closed by doors providing access to the interior thereof for loading and unloading purposes. Accordingly, aerodynamic drag reducing devices designed for use on the rear end of trailers (i.e. boattails) can be hinged panels with guiding tracks and/or pulleys to allow folding during door opening, detachable, and/or provided individually on the doors of the trailer. For some applications, if the device is not going to be used it would have to be stored somewhere in the vehicle or, merely deflated and allowed to remain on the door. Hinged panels require manual intervention and may be subject to mechanical maintenance and other servicing due to snow and ice buildup preventing the operation of the hinged panels. Removal and storage is a labor intensive and time-consuming operation in addition to requiring storage space.

For these reasons inflatable drag reduction boattails have become exemplary because they are light, inexpensive, and may be collapsed without the use of an excessive number of moving parts. However, despite the advantages of inflatable boattails the prior art designs failed to solve the problems associated with loading and unloading the tractor-trailer because the devices are attached as one unit to the back, they are cumbersome to use, or they are excessively large resulting in excess material/weight, higher cost, require driver/operator interaction, and/or produced inferior aerodynamic performance.

The devices currently known to increase aerodynamic efficiency, while somewhat effective, suffer from a number of other drawbacks. The previous devices, heretofore known, that have been attached to the back of trailers often include mechanical fold out panels, inflatables with ram air assist orifices, and very large air volume inflatable devices. The results respectively require: manual operation of the panels that are also subject to snow and icing operational problems; ram air inlet orifices that can clog with debris, snow or ice and with un-regulated internal pressure; and inflatables with huge air volume and footprints that covered the majority of the rear trailer surface but not aerodynamically profiling the full trailer side and also requiring large air blower systems. Similarly, other devices do not allow for the convenient loading and unloading of the trailer's cargo because they consist of a single attached unit that must be removed, or manually activated to fold, including complex mechanical systems that require maintenance. Furthermore, often the prior art devices are ineffective in that they provide little drag reduction when in use, are costly to produce or install, and/or encounter door opening limitations due to their large size.

Accordingly a need exists for an improved aerodynamic drag reduction device for tractor-trailers, trailers, box trucks, etc.

BRIEF SUMMARY

According to one configuration, a drag reducing apparatus for a vehicle rear end is provided comprising a first lobe and a second lobe wherein the lobes are inflatable. Each of the lobes includes a top portion and a leg portion wherein the top portion is integral with the leg portion. The top portion and the leg portion intersect at a joint and form a generally right angle therebetween. Each lobe includes a mounting surface proximal to the vehicle rear end. Each of the lobes has a deflated non-deployed position and an inflated deployed position relative to the vehicle rear end. Each of the lobes includes a profile having a cross sectional three sided shape. Each leg portion of each lobe extends along a majority of a height of the vehicle rear end and each top portion of each lobe extends along generally half the width of the vehicle rear end. The profile includes an aft edge along each lobe wherein the aft edge extends from about 20 inches to about 46 inches rearward from the vehicle rear end.

According to another configuration, an inflatable drag reducer, adapted to be mounted on a rear end of a vehicle transport trailer, is provided comprising a first lobe and a second lobe wherein each lobe includes a top portion and a leg portion. The top portion is integral with the leg portion. The top portion and the leg portion intersect at a joint and form a generally right angle therebetween proximal to a top corner of the rear end of the vehicle. Each lobe includes a mounting surface proximal to the vehicle rear end wherein the mounting surface includes an area. Each lobe has a non-deployed deflated position and a deployed inflated position relative to the vehicle rear end. Each leg portion of each lobe extends along a majority of a height of the vehicle rear end. The vehicle rear end includes an area, wherein a combined mounting surface area of the first lobe and the second lobe is from about 30 percent to about 70 percent of the area of the vehicle rear end.

According to still another configuration, an inflatable drag reducer, adapted to be mounted on the rear end of a vehicle transport trailer, is provided comprising a pair of flexible enclosed lobes. The lobes each have a base surface mounted to the rear end of the vehicle. Each of the lobes comprises a top portion, a leg portion, and a terminal aft-edge over which air passes during forward motion of the trailer. The aft edge is less than 46 inches from the rear end of the vehicle. The drag reducer further includes a mechanism for inflating and deflating the lobes such that upon inflation the pair of lobes assume a collar arrangement around a majority of a perimeter of the rear end of the vehicle wherein the lobes include a substantially triangular cross sectional shape.

BRIEF DESCRIPTION OF THE DRAWINGS

The foregoing objects, and others, will be pointed out more fully hereinafter in conjunction with the written description of exemplary embodiments of the disclosure illustrated in the accompanying drawings in which:

FIG. 9 is a second side elevational view of one lobe of the drag reducing apparatus in the inflated position;

FIG. 10 is a front elevational view of one lobe of the drag reducing apparatus in the inflated position;

FIG. 11 is a cross sectional view of a portion of one lobe shown mounted to a trailer door;

DETAILED DESCRIPTION

The present disclosure provides for drag reduction on a moving object through the atmosphere, thus increasing fuel efficiency. This is accomplished by attaching an inflatable boattail (i.e. drag reducer) to the aft face or rear end of a vehicle or trailer, thus delaying the flow separation to a point further downstream and mitigating the intensity of the negative pressure on the aft face. Due to the resulting decrease in drag having a great affect on larger bodies (i.e. tractor-trailers or semi-trailers) the boattail's use will be described in relation to tractor-trailers, but the disclosure is not limited to this application.

Figure 1:
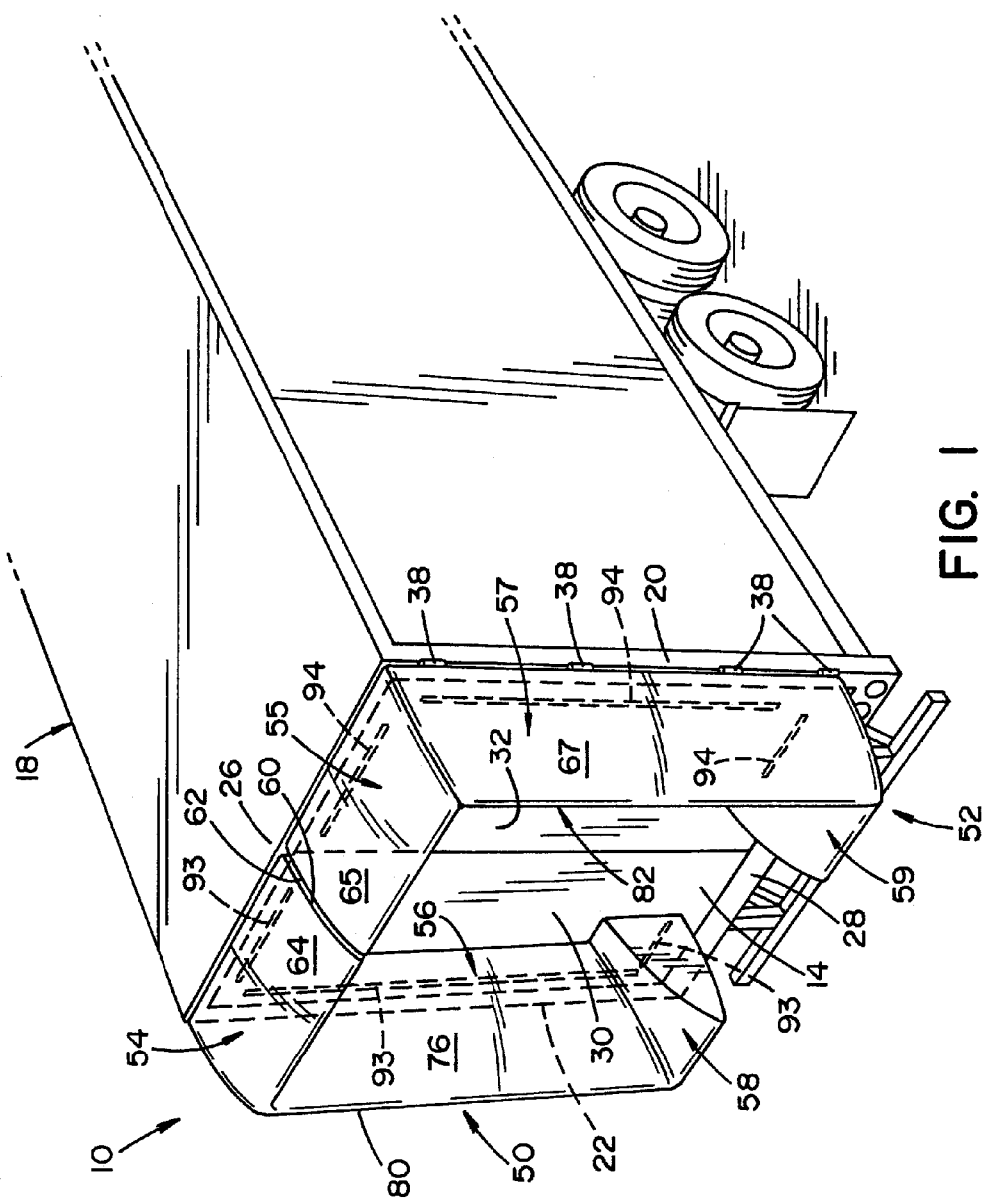
FIG. 1 is a perspective view of a tractor trailer vehicle with a drag reducing apparatus, in accordance with a first embodiment, in the inflated position attached to the rear (aft face) of the trailer.
Figure 2:
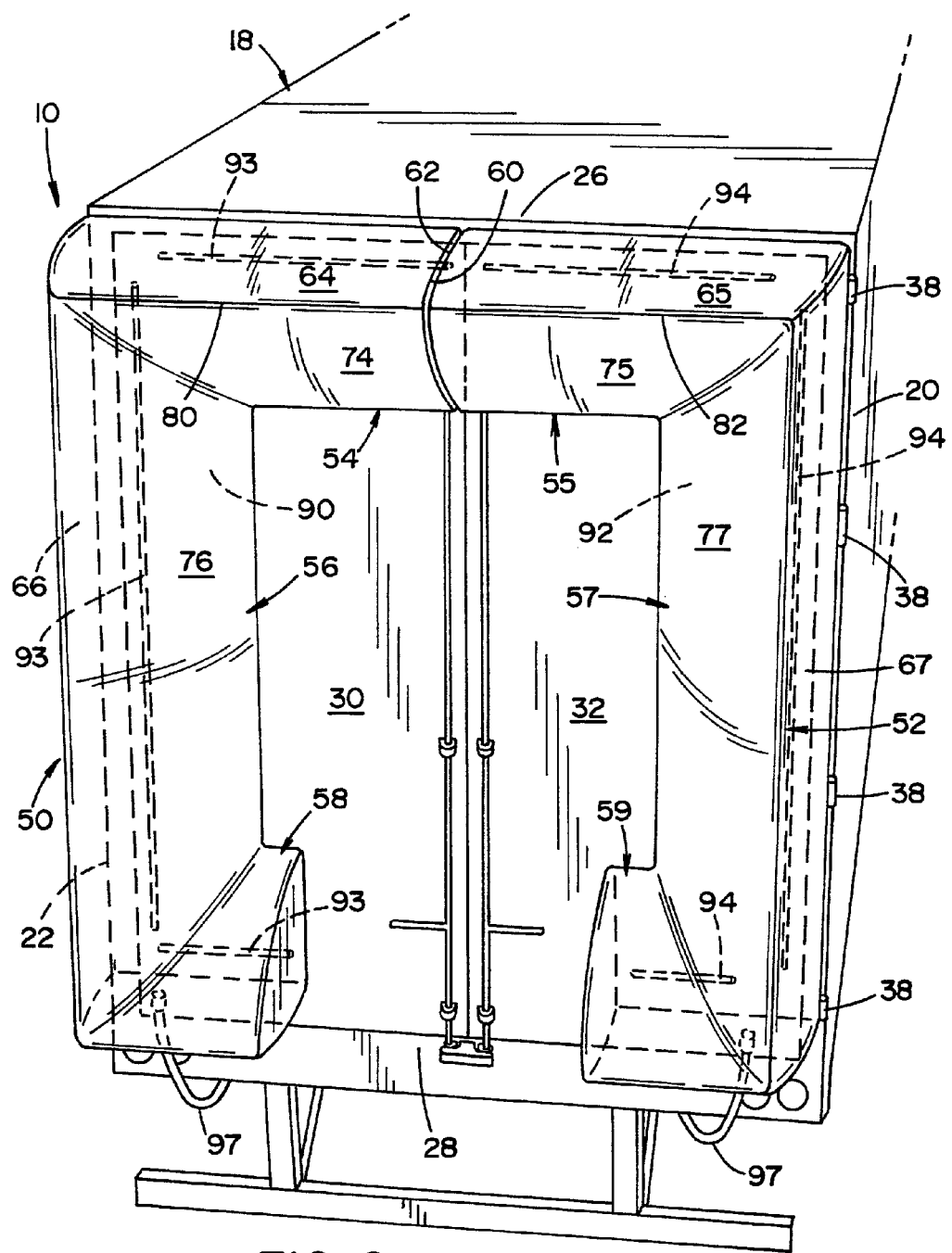
FIG. 2 is a rear perspective view of a tractor trailer vehicle with the drag reducing apparatus of FIG. 1 in the inflated position attached to the rear (aft face) of the trailer.
Figure 3:
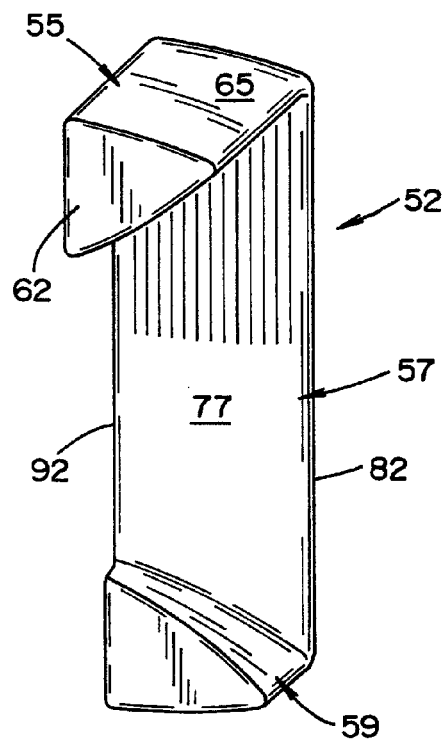
FIG. 3 is a perspective view of one lobe of the drag reducing apparatus in the inflated position.
Figure 4:
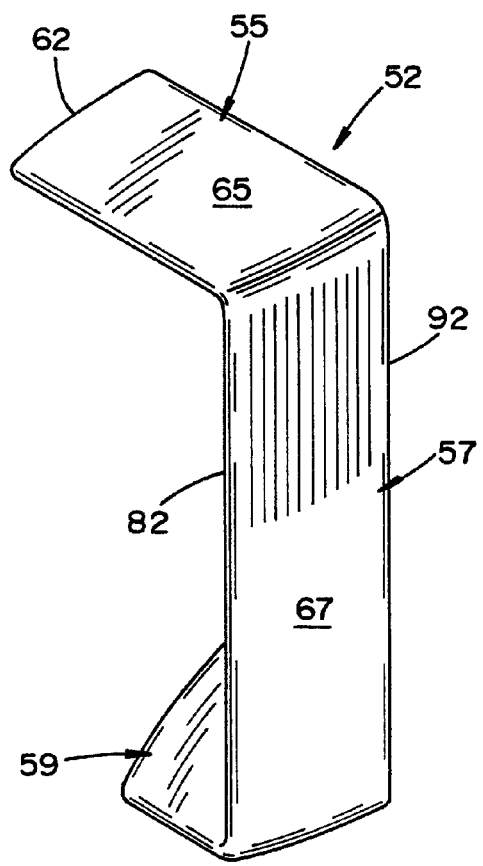
FIG. 4 is a perspective view of one lobe of the drag reducing apparatus in the inflated position.
Figure 7:
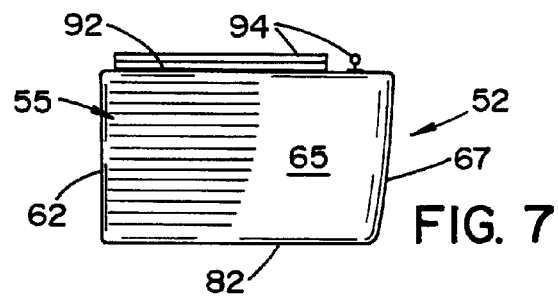
FIG. 7 is a top elevational view of one lobe of the drag reducing apparatus in the inflated position.
Figure 5:
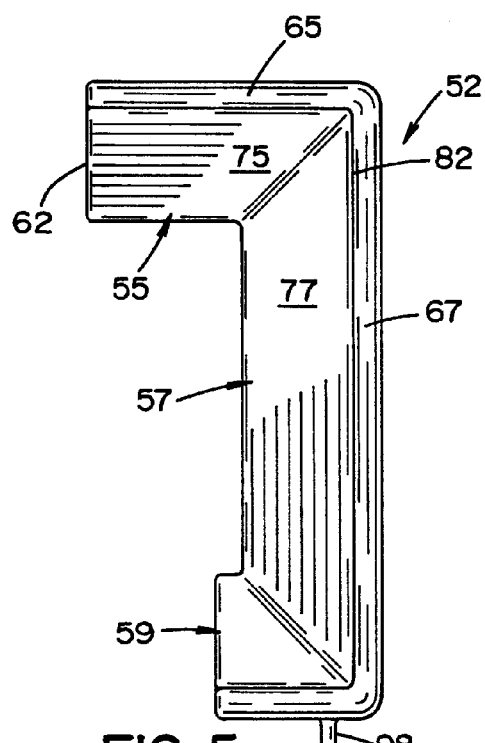
FIG. 5 is a rear elevational view of one lobe of the drag reducing apparatus in the inflated position.
Figure 6:
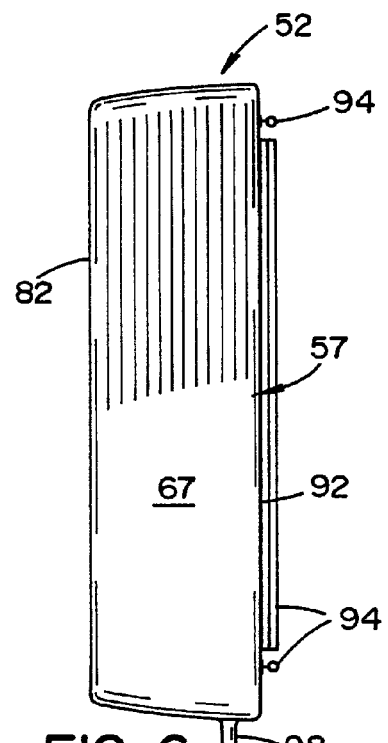
FIG. 6 is a first side elevational view of one lobe of the drag reducing apparatus in the inflated position.
Figure 8:
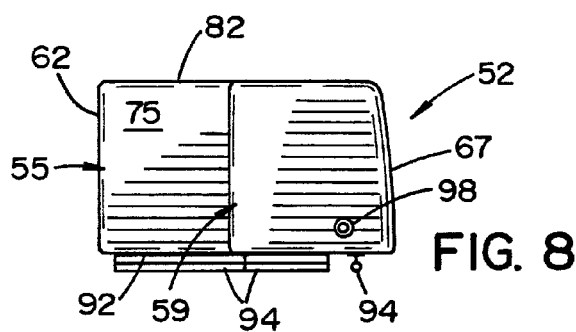
FIG. 8 is a bottom elevational view of one lobe of the drag reducing apparatus in the inflated position.
Figure 13:
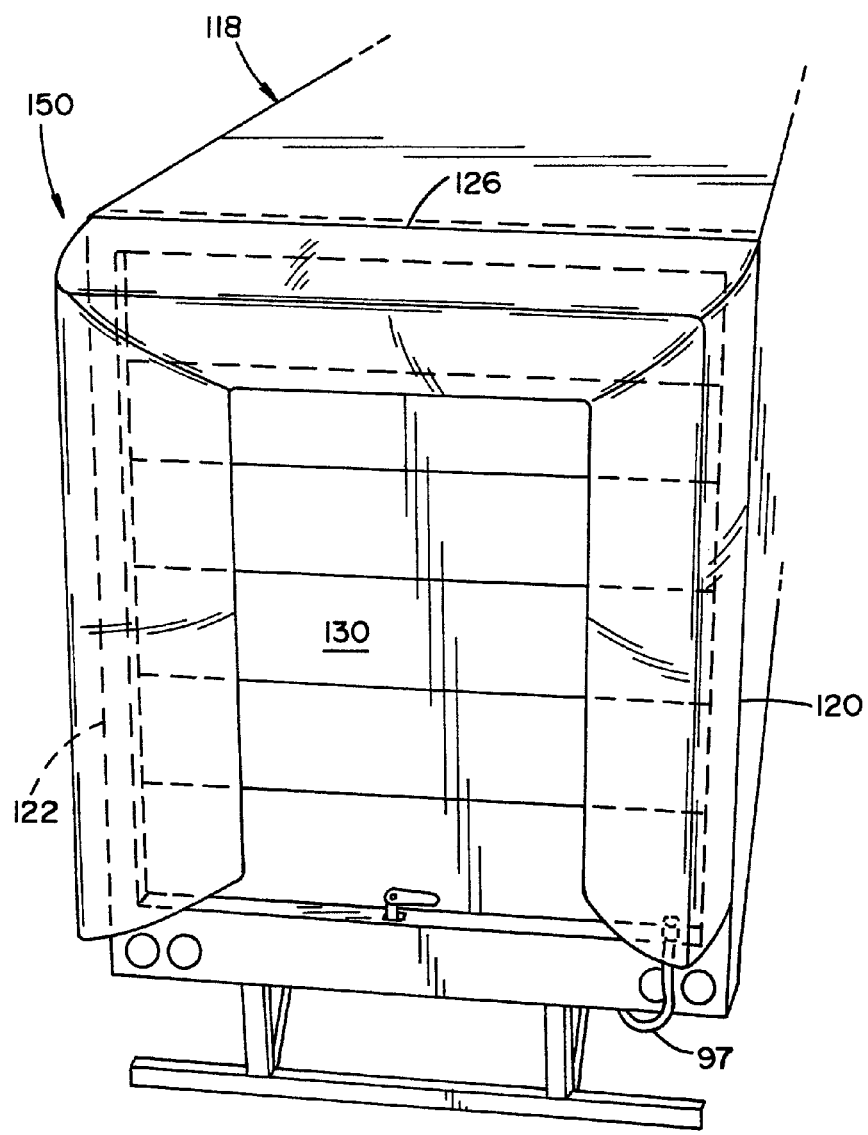

Referring now to the Figures, wherein the showings are for the purpose of illustrating embodiments only and not for the purpose of limiting the disclosure, there is shown a drag reducing apparatus or boattail 10 in accordance with a first embodiment of the disclosure mounted on a rear face 14 of a motor vehicle or vehicle trailer 18 (FIGS. 1 and 2). The vehicle can include a trailer 18 as part of a tractor-trailer vehicle combination wherein the trailer 18 further includes an opposed pair of parallel vertical side walls 20, 22 and opposed parallel top and bottom walls 26, 28. The rear end 14 of the trailer 18 can further include a substantially flat vertically extending rear surface which can be generally defined by a pair of rear doors 30, 32 or a single roll-up door 130 (FIG. 13). The rear end 14 of the trailer 18 can be defined by peripheral trailer frame portions 20, 22, 26, 28 which are coplanar with and extend about the doors 30, 32. In one exemplary embodiment, each of the rear doors 30, 32 is respectively mounted on frame portions by hinges 38 such that the doors 30, 32 are horizontally pivotal about vertical hinge axes between the closed positions and open positions in which the doors extend laterally outwardly and, preferably, forwardly of the trailer frame portions 20, 22 when in the fully opened and latched position. The doors 30, 32 typically hinge around the vertical axes such that the exterior sides of the doors are respectively proximal to opposing sides of the trailer when the doors are fully opened (not illustrated).

In one exemplary embodiment illustrated in FIGS. 1-11, the drag reducing apparatus 10 includes a pair of inflatable lobes or bags 50, 52. Each lobe or bag 50, 52 can be mounted on a rear door 30, 32, respectively, as described in greater detail hereinafter. Each lobe can be adapted to be displaced from a deflated or non-deployed position to an inflated or deployed position overlying a respective rear door 30, 32 of the trailer 18 between opposing edges and, in the latter position, is adapted to be inflated to provide an aerodynamic contour extending rearwardly of the vehicle as illustrated in FIGS. 1 and 2. The lobes 50, 52 are shown in a deployed position in FIGS. 1-10.

The lobes 50, 52 can be made from, for example, a polymer coated polyester fabric. The fabric can be constructed of a relatively thin, light, air tight and flexible material that is non-elastic in structure and resistant to tears, punctures, abrasion, ozone, ultraviolet radiation, hydrocarbons and road debris that may be encountered at this location. The air tight aspect of the lobes 50, 52 is energy efficient in that it enables just one fill for the duration of the trip until the next stop. To be described in more detail hereinafter, the ADS control automatically monitors internal lobe air pressure and will automatically refill to maintain the lobe air pressure to the desired setpoint.

When the lobes 50, 52 are in the deployed position and secured relative to the trailer doors 30, 32 as described above, they are adapted to be inflated so as to extend rearwardly from the trailer doors and provide the desired aerodynamic contours to be described in more detail hereinafter. As will be appreciated from FIGS. 1-2 of the drawings, when the pair of lobes 50, 52 are inflated to provide the aerodynamic profile for which they are configured, they comprise at least a three-walled collar arrangement (FIGS. 1 and 2). The lobe walls can be controlled to have a pre-determined specific profile on the outer perimeter/surface of the boattail system 10 to create a beneficial aerodynamic air flow geometry at the rear of the trailer 18. The overall shape of the lobe cross section is generally radial, curvilinear, and/or substantially planar surfaces. In one embodiment, the lobes 50, 52 can achieve rigidity and ensure stability with the desired profile shape in the fully inflated deployed position during highway travel via a series of internal substantially inelastic restraining straps, internal profiled planar sheets, and/or flag sets oriented in an array on the inside of each lobe (not shown). In one arrangement, an array of horizontal substantially inelastic straps can originate from one side of the lobe and extend to the other opposing side of the lobe connecting a plurality of flag sets at spaced positions on the inside surface. It is to be appreciated that there can also be numerous substantially horizontal straps, or planar sheets, connecting the plurality of flag sets (i.e. flexible material such as polymer coated polyester that allows air flow through it or with holes to allow air flow) cut to specific profiles, between the opposing sides of each lobe. Additionally, an array of substantially vertical inelastic cords, flag sets, or planar sheets (not illustrated) can be cut to specific profiles and connected to the inside surfaces of the lobes. The straps and flag sets restrain the lobes to a shape that substantially conforms to the boattail geometry hereinafter described. The aforementioned construction facilitates the desired inflated shape, without which the lobes would form more to the shape of a sphere or other rounded less aerodynamically efficient configuration.

As described above, the present disclosure provides for the placement of the array of similar connecting devices, for the dual lobe configuration such that each lobe comprises a combination of sloped substantially planar, curvilinear, or other radial surfaces. According to the first embodiment, each lobe 50, 52 can comprise a top portion 54, 55, a leg portion 56, 57, and a base portion 58, 59 (refer to FIGS. 1-11). The respective three portions form a generally 'C' shaped configuration (FIGS. 1-2). The lobes 50, 52 can meet together when inflated at the intersection of terminal edges 60, 62 of the top portions to form a desired singular wall effect and yet pull away from each other when deflated. Each lobe 50, 52 can comprise a substantially three sided apparatus, thus forming a generally triangular cross sectional shape. The lobes combined together form a generally collar-shaped arrangement extending around a majority of the perimeter of the vehicle rear end.

The outboard surfaces or exterior faces 64, 65 of the top portions 54, 55 can each have a slope angle from about 2 degrees to about 10 degrees as measured from a first plane perpendicular to the rear doors (i.e. slope of descent). The exterior faces 66, 67 of the leg portions 56, 57 can each have a slope angle from about 2 degrees to about 10 degrees as measured from a second plane perpendicular to the rear of vehicle (i.e. from the perpendicular toward the inboard direction or slope of descent). The first and second planes are orthogonal to one another. In another arrangement, the respective outboard surfaces can have radial or curvilinear surfaces including a radius from about 100 inches to about 200 inches such that these surfaces start tangentially to the trailer top 26, or sides 20, 22, and curve toward the centerlines of the trailer.

The inboard surfaces or interior faces 74, 75 of the top portions 54, 55 can each have a slope angle from about 20 degrees to about 60 degrees as measured from a first plane perpendicular to the rear door (i.e. slope of descent). The interior faces 76, 77 of the leg portions 56, 57 can have a slope angle from about 20 degrees to about 60 degrees as measured from a second plane perpendicular to the rear of vehicle (i.e. slope of descent). The first and second planes are orthogonal to one another. In another arrangement, the inner faces 74, 75, 76, 77 can have radial or curvilinear surfaces including a radius from about 50 inches to about 250 inches. The aft edges 80, 82 that transition from the outboard surfaces 64, 65, 66, 67 to the inboard surfaces 74, 75, 76, 77 can include a plurality of dimples thereon (not shown) for turning more air into a negative pressure region and improving the drag reduction of the lobes 50, 52. The dimples can have a diameter in the range from about ⅛ inch to about 1 inch.

The respective interior faces 74, 75, 76, 77 and the exterior faces 64, 65, 66, 67 of the associated top 54, 55 and leg portions 56, 57 of each lobe 50, 52 merge to form an aft-edge 80, 82, respective to each lobe. In one exemplary embodiment, the exterior faces and the interior faces and the aft-edge 80, 82 of each lobe 50, 52 form a truncated substantially triangular collar shape (FIGS. 1-2) over which the air passes during forward motion of the trailer. In one exemplary embodiment, each lobe 50, 52 can be configured such that the aft-edge 80, 82 is less than 48 inches away from, or distal to, the respective rear door 30, 32 (i.e. boattail extension length) when the lobe 50, 52 is in the deployed position. The aforementioned distance corresponds to the boattail extension length. In another arrangement, each lobe 50, 52 can be configured such that the aft-edge 80, 82 is from about 18 inches to about 46 inches away from the vehicle rear end 14 when the lobe 50, 52 is in the deployed position.

The aft-edge 80, 82 of each lobe 50, 52 defines a perimeter extending across a majority of the top of the rear door, a majority of the side of the rear trailer door, and selectively along a portion of the bottom of the rear door. The aft-edge 80, 82 can maintain a consistent distance (i.e. aft extension) from the rear of the door 30, 32, respectively. It is to be appreciated that the aft-edge 80, 82 can be generally rectilinear in shape. The aft edge can be flat/parallel to the rear door or have a blending radius between the outboard and inboard faces. In one arrangement, the blending radial aft-edge includes a curvilinear radius from about 3 to about 8 inches. It is to be appreciated that the aft-edge can correspond to a portion of the perimeter of each rear door. Each of the lobes 50, 52, respectively, can have an aft-edge 80, 82 that extends across the top of each door leaving a minimal to zero gap between the terminal edges 60, 62 of the top portions 54, 55 of opposing lobes 50, 52. The aft-edge of each leg portion 56, 57 can extend from about 65% to about 100% along each door side 30, 32. The bottom of the legs may have a face similar to terminal faces 60,62 or if the lobes 50, 52 include base portions 58, 59, the aft edge of each base portion can extend from about 30% to about 70% along the door bottom. In this manner, the respective aft-edge 80, 82 can extend from about 45% to about 80% around the perimeter of door 30, 32. The combined area of the base or mounting surfaces 90, 92 of the lobes 50, 52 can range from about 20% to about 65% relative to the area of the vehicle rear end 14.

The volume of each lobe 50, 52, due to its collar shape, comprises much less volume (approximately 50% less) than boattail configurations heretofore developed. The volume of each lobe will vary with the size of trailer doors 30, 32 and perimeters covered, but will typically be in the range from about 18 cubic feet to about 35 cubic feet, or from about 1.2 cubic feet to about 2.7 cubic feet per linear foot of trailer perimeter. The reduced volume provides a savings relative to the material needed to create each lobe, less energy and air blower size required to inflate, as well as, improved durability due to less material being exposed to the wind and elements. In addition, the reduced volume provides for improved performance due to quicker inflation and deflation. Thus, the generally triangular cross section of the lobes 50, 52 enables reduced cost and quicker deployment, and also provides for improved side wind stability by virtue of minimizing the size of a rear surface exposed to cross winds and minimizing the drag created by the lobes themselves.

The mounting surface 90, 92 can include welded beads 93, 94 attached around the outside perimeter, or substantially around the perimeter, of each lobe 50, 52 (FIGS. 9-11). The welded beads 93, 94 can then be slid through a mating "c" hold down rail or channel 96, including a corresponding perimeter on each door, aligned to the perimeter of each lobe. It is to be appreciated that the "c" rail 96 can be attached to the door with round head bolts and nuts, or attached to a frame recess, or frame 450, 452 (FIG. 26) such that the inflatable lobes 50, 52 can be mounted to and swung away to expose a rollup door type trailer.

It is to be appreciated that the dual lobe 50, 52 configuration provides a combined aft-edge 80, 82 that extends around a majority of the perimeter defined by the rear 14 of the trailer 18 which reduces the overall drag on the vehicle. The two lobes 50, 52, acting as a coordinated unit, have been shown through wind tunnel testing to provide improved drag reduction when compared to other boattail, or similar, structures. Additionally, the wind tunnel testing showed that improved drag reduction resulted when lobes were mounted substantially across the top, and aligned within 0-3 inches of the top edge 26 and side edges 20, 22 of the trailer 18.

Figure 27:

The triangular cross sectional design shape of the lobes 50, 52 also improves drag reduction by providing sloped or radial inboard surfaces that weaken the rear end air vortices thus reducing the attending negative pressure. The above described inflatable boattail provides an improved aerodynamic profile (when inflated) extending from the rear of the trailer. The resultant drag reduction can amount to as much as 13% which equates to fuel efficiencies over 6% at 75 mph (refer to FIG. 27) based on wind tunnel tests and analysis of the associated drag at various speeds. Wind tunnel results comparing performance of the presently described inflatable boattails to other inflatable boattails, rigid panel boattails, and side-skirt fairings are displayed in the chart of FIG. 27. The test results T1, T2 of two different lengths (i.e. 40 inch and 28 inch) of boattails, according to the present disclosure, are displayed in FIG. 27 and compared to a variety of other drag reducing apparatuses. It is to be appreciated that the inflatable lobes, according to the present disclosure, provided the best performance when compared to all other rear mounted fairing devices. It is to be further appreciated that the inflatable of the present disclosure can be used with side skirt aerodynamics to enable a complimentary (i.e. combined) benefit to drag reduction (see results T3 of last column in FIG. 27).

Figure 12:
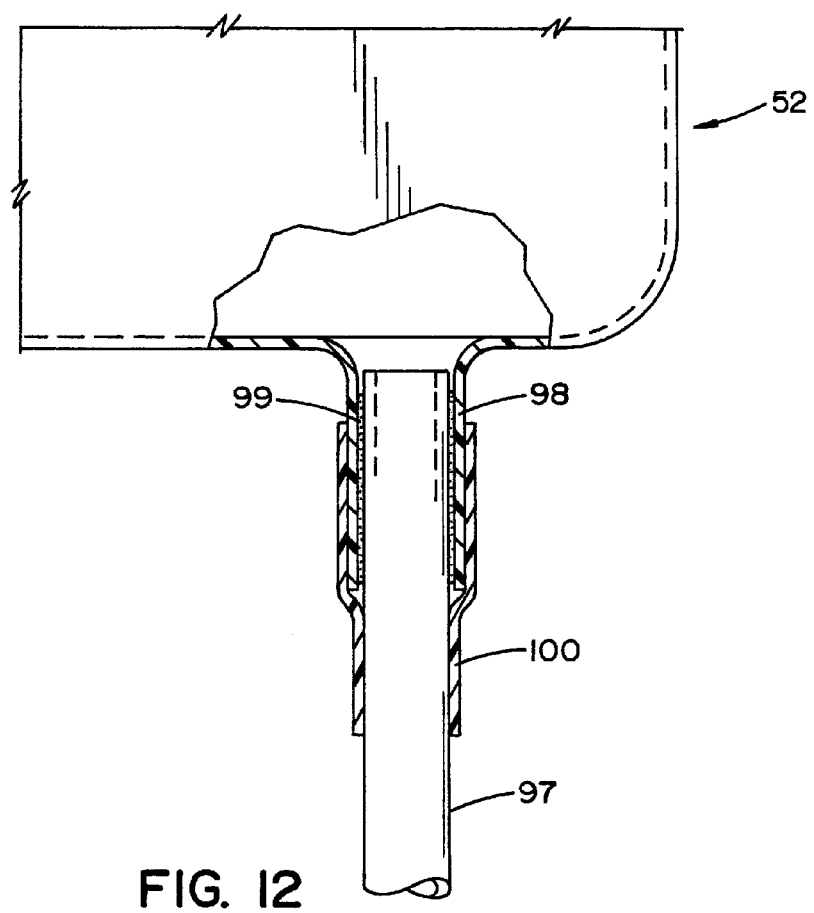
FIG. 12 is a cross sectional view of a flexible duct for passing air to the lobes; and, FIG. 13 is a perspective view of a trailer vehicle with a second embodiment of a drag reducing apparatus in the inflated position attached to the rear (aft face) of the trailer.

In one arrangement, each air duct 97 connected to a respective lobe 52 can include a sealed connection therewith. The connection can include the individual flexible hoses 97 inserted into a narrow tube-like or snout opening 98 extending from each lobe 52. Each flexible hose 97 can be slid into the snout opening 98 with a silicone sealant (or other sealant) applied 99. A heat shrink tubing or collar 100 is then positioned to overlap this subassembly. The heat shrink tubing 100 is then heated to compress tightly around the subassembly to form a long lasting leak proof connection (FIG. 12). In this manner, an extremely flexible connection is maintained between each lobe and its respective air duct without any obstructing hardware or other devices encumbering its range of motion. Alternatively, other mechanical screw in or valve type interface adapters can be utilized.

Likewise, the single lobe 150 includes a continuous one piece construction and provides similar improved drag reduction. The single lobe configuration 150 includes a continuous arrangement extending from one side 122 of the trailer, across the top 126 of the trailer, and then along the other side 120 of the trailer 118 (FIG. 13). It is to be appreciated that the continuous arrangement of lobe 150 comprises similar geometry and surface aerodynamics as the two lobe version described above. The lobe can be retained within a cavity 127 in the top 126 and sides 120, 122 of the trailer frame such that in the vacuum state the lobe is largely retracted within the cavity (not shown) and when the lobe is inflated it is deployed out from the cavity to the rear of the trailer as shown in FIG. 13.

Figure 14:
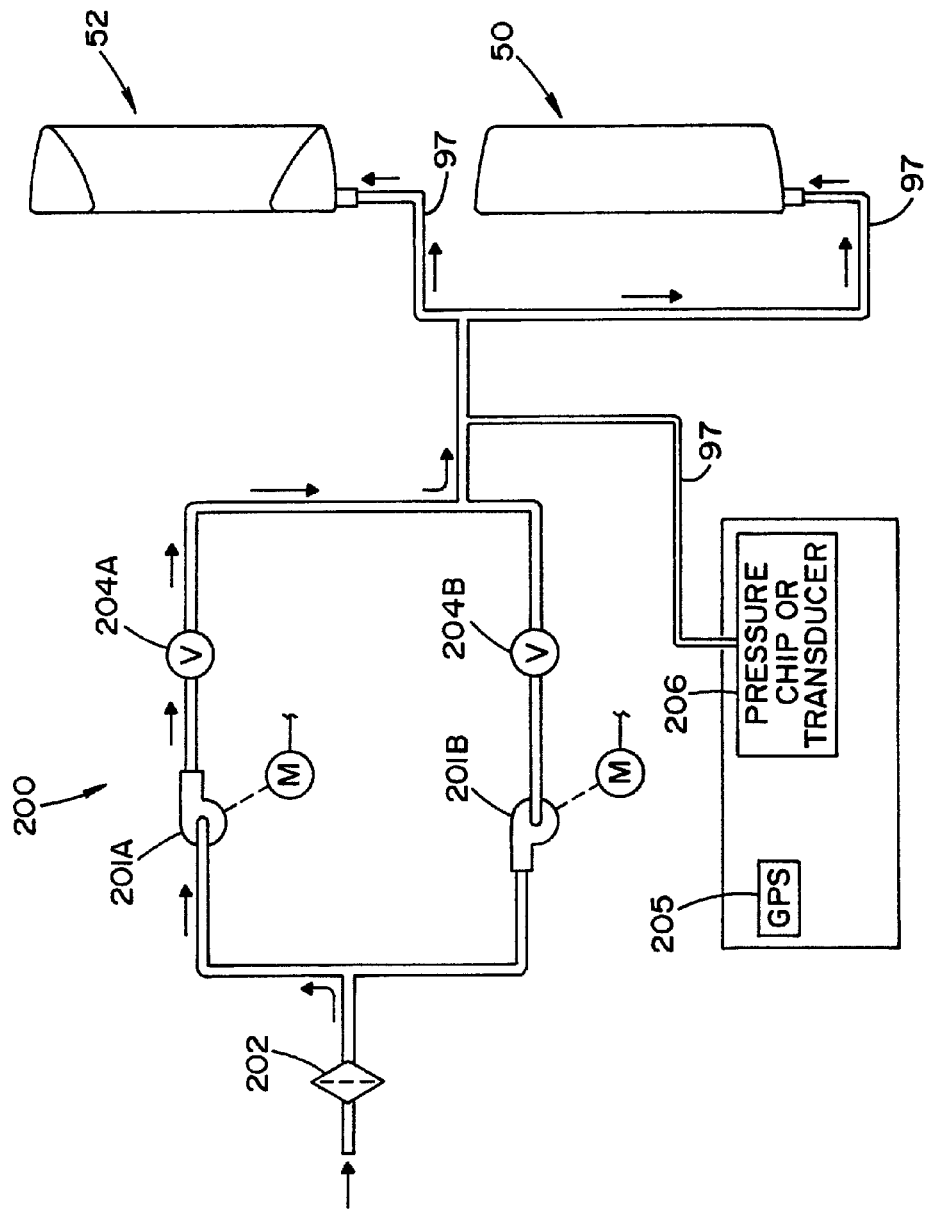
FIG. 14 is a pneumatic schematic diagram for an automated air distribution system (ADS)

More particularly with regard to the support and displacement of each lobe 50, 52 between the deflated and deployed positions thereof, an automated air distribution system (ADS) 200 can be provided and can be mounted, for example, to the undercarriage of the trailer by a variety of methods such as simple frame bolting to the underside mechanical members or a pair of support arms at laterally opposite ends of the ADS and to which the ADS is suitably secured (not illustrated). The ADS 200 (FIG. 14) may use a totally self-contained electrically operated air supply using outside air including an inflate flower 201A and a deflate blower 201B, air filter 202, manual or automated inflate valve 204A and deflate valve 204B, speed sensing using a dedicated GPS 205 or communication to the trailer's ABS for speed sensing or the addition of other speed sensing techniques such as a wheel speed sensor, pressure transducer 206, temperature sensing and electronic controls with I/O logic. Alternatively, the ADS air supply 200 can be obtained from the trailer air system using pneumatic valves including a blower. A connection of the ADS air supply 97 can be made to the bottom of each lobe 50, 52 for inflation or deflation.

Figure 15:
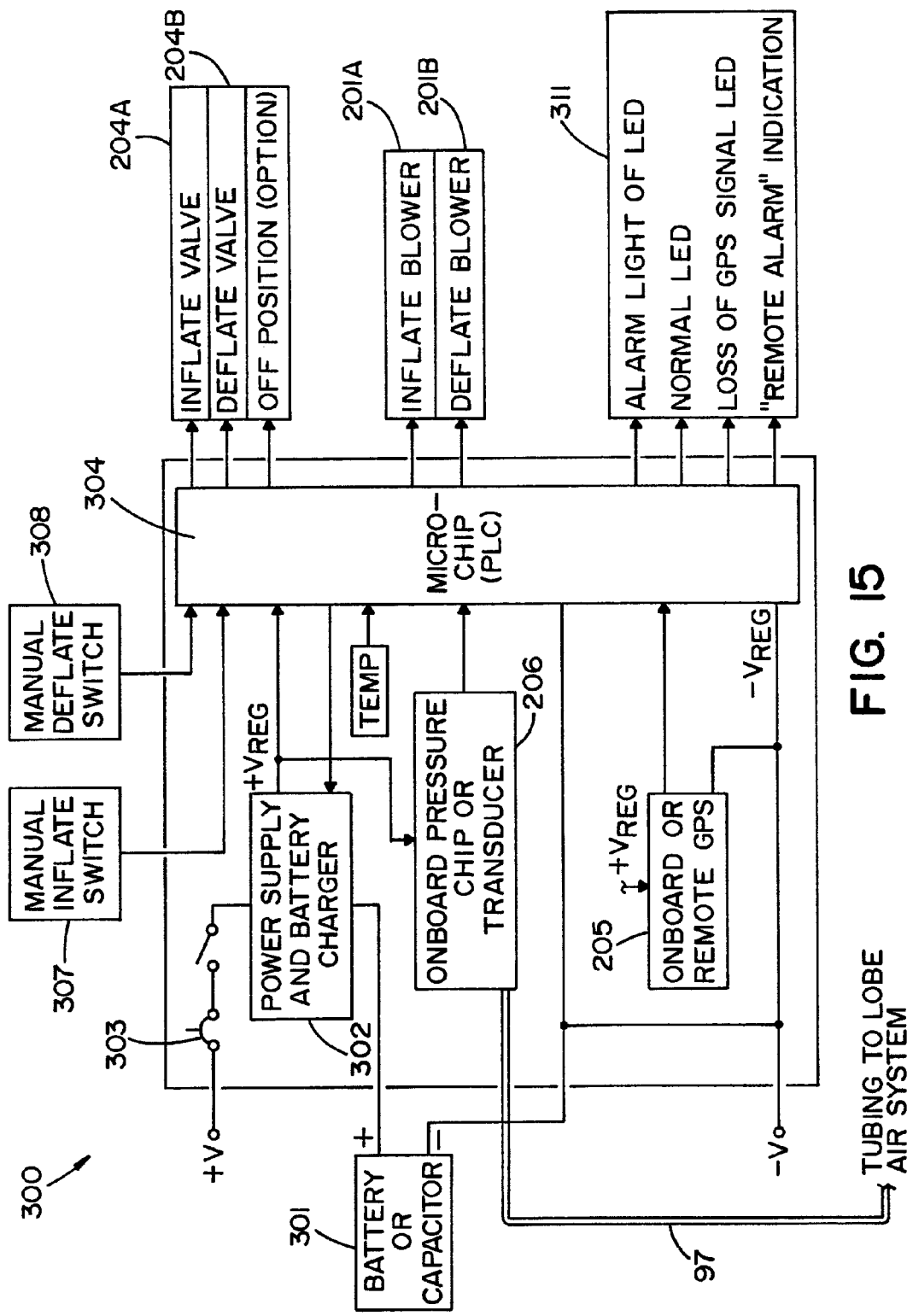
FIG. 15 is an electrical schematic diagram for the automated air distribution system, micro-computer, battery, GPS, and other sensors.

Referring to FIG. 15, an electrical schematic diagram 300 for the ADS is therein shown. The electrical diagram provides complete control using a micro-computer chip or PLC, energy storage via a battery or capacitor 301, a charger 302, overcurrent protection 303, and a programmable chip 304. Inputs include pressure detection using the lobe pressure detection with on-board pressure chip 206, speed sensing with on-board GPS chip 205 or remote mounted GPS. Micro-Chip (PLC) programming includes charger and direction algorithm, and output responses based on speed, direction, altitude, temperature, pressure, input commands and incoming power status. The system can further provide for a manual inflate push button 307, a manual deflate push button 308, inflate valve 204A, deflate valve 204B, and systems status indicators 311.

Referring again to FIG. 14, it is to be appreciated that manual commands and electrically operated valves can be provided for controlling air flow direction and holding pressure in the deployed boattail including reversing air flow such that the motor/blower 201B acts as a vacuum for extracting the air from the lobes 50, 52 in the deflated or second position. In the second position, the ADS 200 can provide a suction or vacuum force to the lobes 50, 52 which results in the lobes being retained adjacent to, and substantially flat against, the respective door 30, 32 to which it is mounted. The deflated and retained lobe positions can be in a vacuum state, thereby resisting flailing of the lobes when the truck is in motion.

Figure 16:
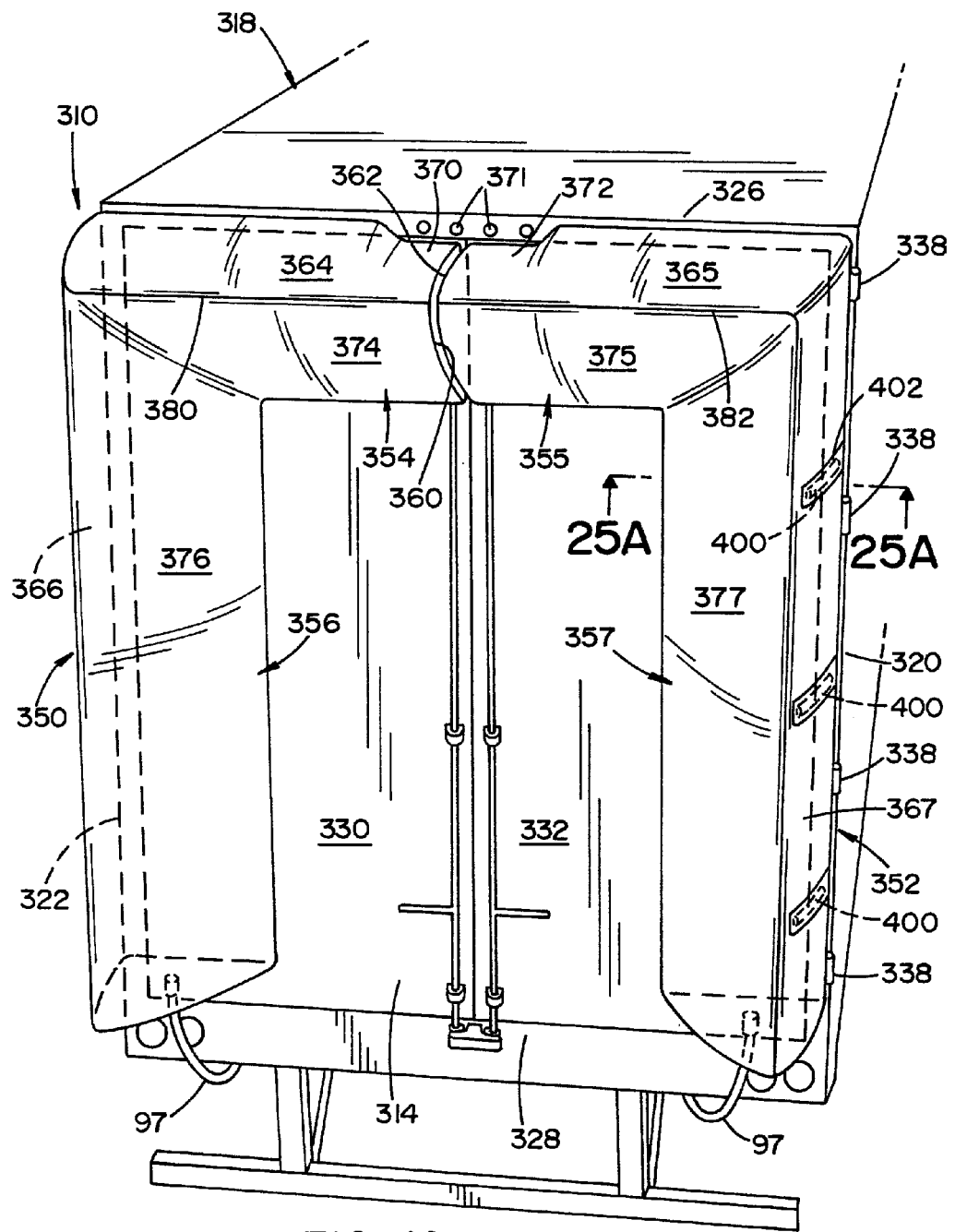
FIG. 16 is a perspective view of a trailer vehicle with a third embodiment of a drag reducing apparatus in the inflated position attached to the rear (aft face) of the trailer.
Figure 17:
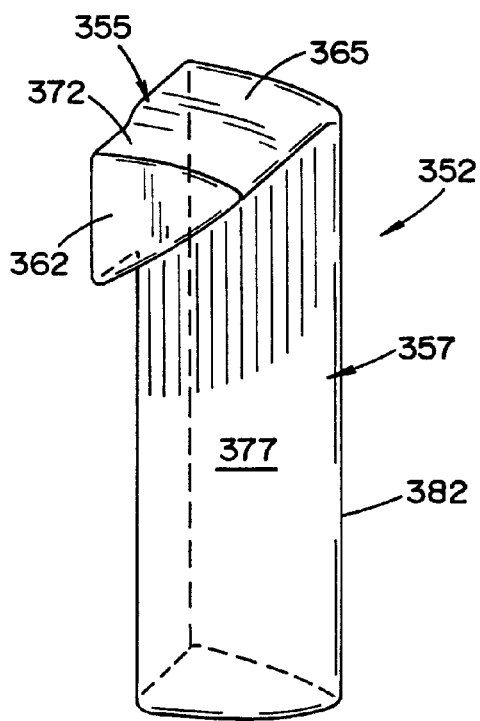
FIG. 17 is a perspective view of one lobe of the drag reducing apparatus of FIG. 16 in the inflated position.
Figure 18:
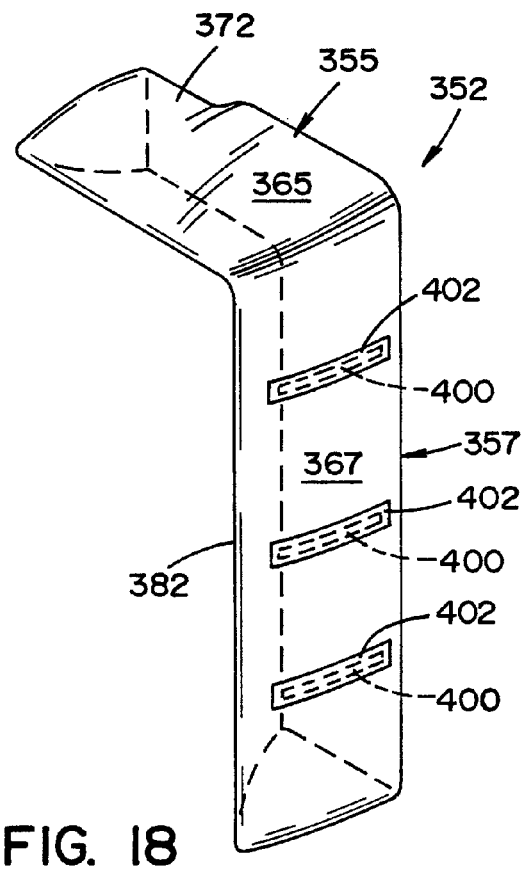
FIG. 18 is a perspective view of one lobe of the drag reducing apparatus of FIG. 16 in the inflated position.
Figure 21:
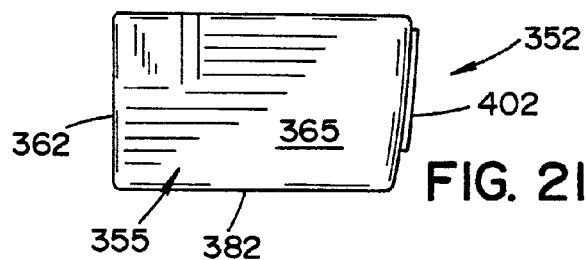
FIG. 21 is a top elevational view of one lobe of the drag reducing apparatus of FIG. 16 in the inflated position.
Figure 19:
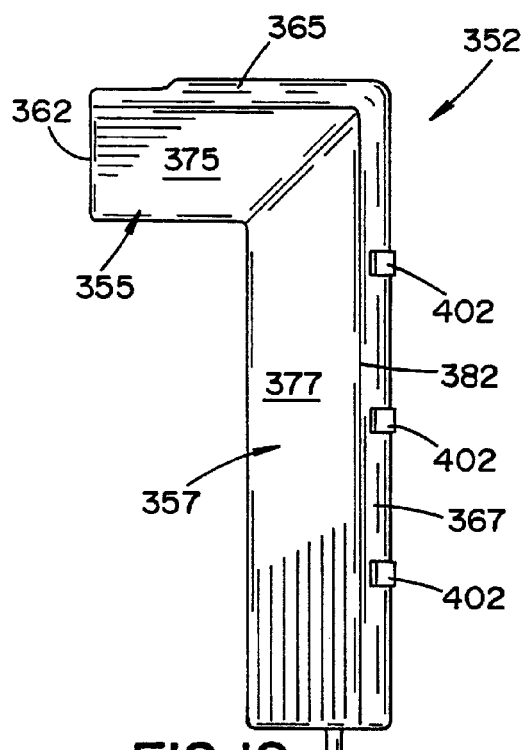
FIG. 19 is a rear elevational view of one lobe of the drag reducing apparatus of FIG. 16 in the inflated position.
Figure 20:
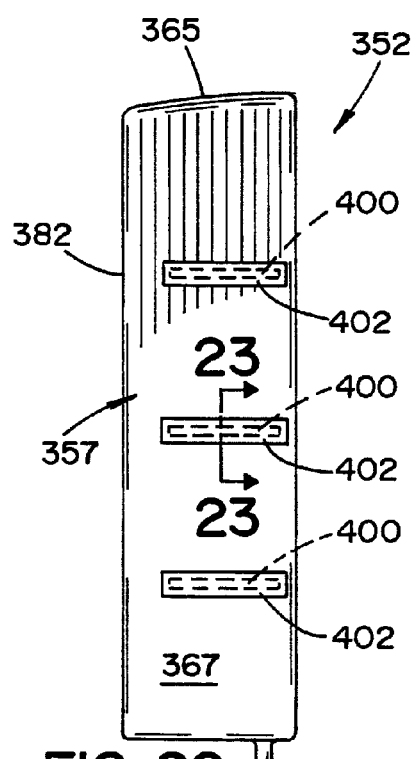
FIG. 20 is a first side elevational view of one lobe of the drag reducing apparatus of FIG. 16 in the inflated position.
Figure 22:
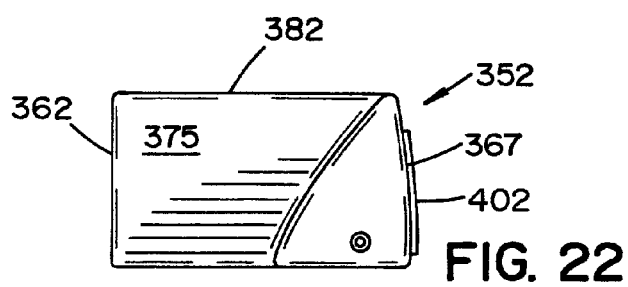
FIG. 22 is a bottom elevational view of one lobe of the drag reducing apparatus of FIG. 16 in the inflated position.

Referring now to FIGS. 16-22, there is shown a drag reducing apparatus 310 in accordance with a third embodiment of the disclosure mounted on a rear face 314 of a motor vehicle or vehicle trailer 318 (FIG. 16). The vehicle can include the trailer as part of a tractor-trailer vehicle combination wherein the trailer 318 further includes an opposed pair of parallel vertical side walls 320, 322 and opposed parallel top and bottom walls 326, 328. The rear end 314 of the trailer 318 can further include a substantially flat vertically extending rear surface which can be generally defined by a pair of rear doors 330, 332 or a single roll-up door. The rear end 314 of the trailer 318 can be defined by peripheral trailer frame portions 320, 322, 326, 328 which are coplanar with and extend about the doors 330, 332. In one exemplary embodiment, each of the rear doors 330, 332 is respectively mounted on frame portions by hinges 338 such that the doors 330, 332 are horizontally pivotal about vertical hinge axes between the closed positions and open positions in which the doors extend laterally outwardly and, preferably, forwardly of the trailer frame portions 320, 322 when in the fully opened and latched position. The doors 330, 332 typically hinge around the vertical axes such that the exterior sides of the doors are respectively proximal to opposing sides of the trailer when the doors are fully opened (not illustrated).

The drag reducing apparatus 310 can include a pair of inflatable lobes or bags 350, 352. Each lobe or bag 350, 352 can be mounted respectively on rear doors 330, 332. When the lobes 350, 352 are in the deployed position and secured relative to the trailer doors 330, 332 as described above, they are adapted to be inflated so as to extend rearwardly from the trailer doors and provide the aerodynamic contours to be described in more detail hereinafter.

According to the third embodiment, each lobe 350, 352 can comprise a top portion 354, 355, and a leg portion 356, 357, (refer to FIGS. 16-22). The two portions form a right angle shaped configuration (FIG. 16). The lobes 350, 352 can meet together when inflated at the intersection of terminal edges 360, 362 of the top portions to form a desired singular wall effect and yet pull away from each other when deflated. Each lobe 350, 352 can comprise a generally triangular cross sectional shape. The lobes together form a generally collar-shaped arrangement extending around a majority of the perimeter of the vehicle rear end.

The outboard surfaces or exterior faces 364, 365 of the top portions 354, 355 and the outboard surfaces or exterior faces 366, 367 of the leg portions 356, 357 can each have slope angles similar to the corresponding surfaces of the first embodiment.

The inboard surfaces or interior faces 374, 375 of the top portions 354, 355 and the inboard surfaces or interior faces 376, 377 of the leg portions 356, 357 can have slope angles similar to the corresponding surfaces of the first embodiment.

The respective interior faces 374, 375, 376, 377 and the exterior faces 364, 365, 366, 367 of the associated top 354, 355 and leg portions 356, 357 of each lobe 350, 352 merge to form an aft-edge 380, 382. The exterior faces and the interior faces and the aft-edge 380, 382 of each lobe 350, 352 form a truncated substantially triangular collar shape over which the air passes during forward motion of the trailer.

The aft-edge 380, 382 of each lobe 350, 352 defines a perimeter extending across a majority of the top of the rear door and a majority of the side of the rear trailer door. The aft-edge 380, 382 can maintain a consistent distance (i.e. aft extension) from the rear of the door 330, 332, respectively. The aft-edge of each leg portion 356, 357 can extend from about 65% to about 100% along each door side 330, 332.

Figure 23:
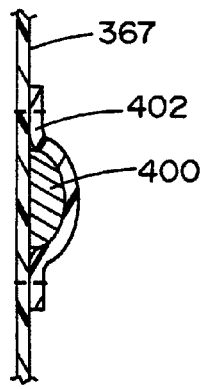
FIG. 23 is a cross-sectional view of a batten insert taken along line 23-23 of FIG. 20.
Figure 24:
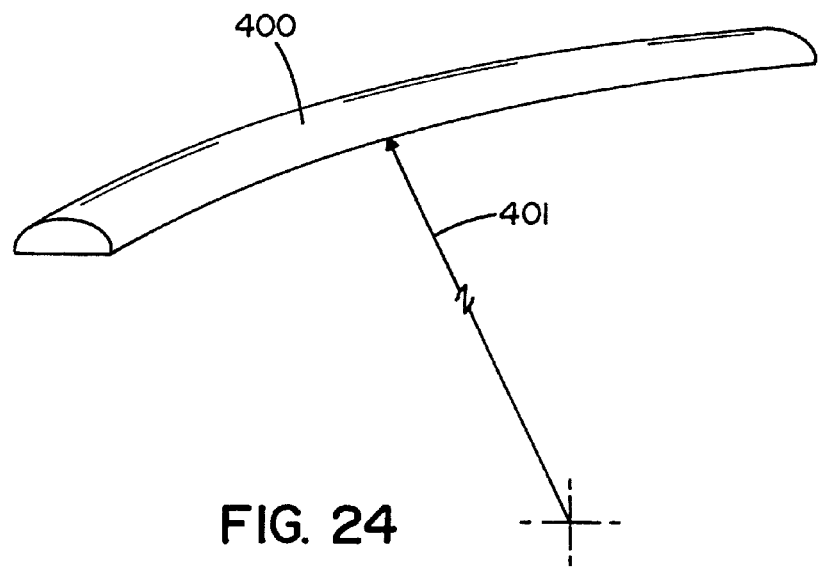
FIG. 24 is a perspective view of the batten insert.
Figure 25A:
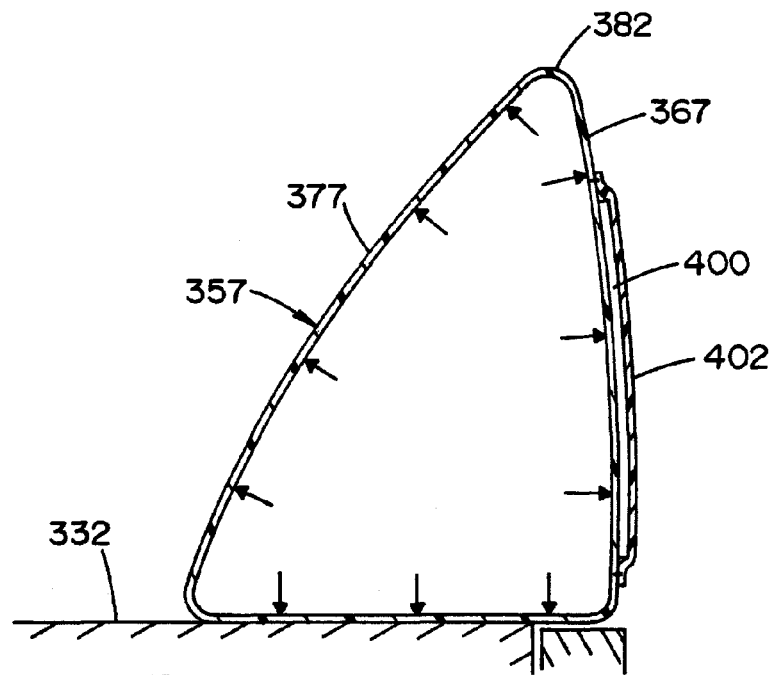
FIGS. 25A-25D are a progression of cross-sectional views showing a lobe going from an inflated orientation (taken along 25A-25A of FIG. 16) to a deflated and folded orientation (25D)
Figure 25B:
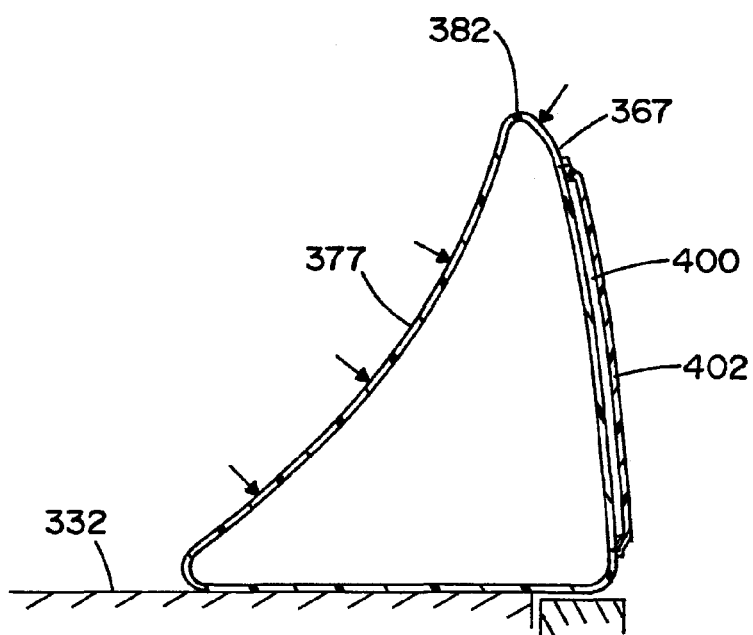
Figure 25C:
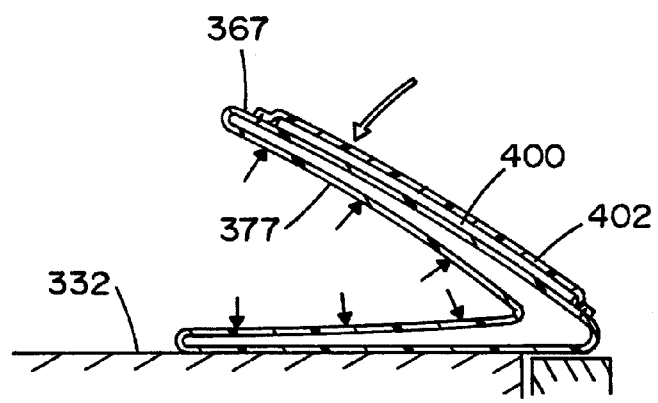
Figure 25D:
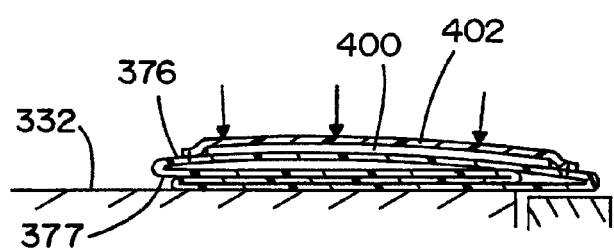

In another arrangement, the lobes 350, 352 can include the addition of strategically placed semi-rigid or rigid batten members 400 (FIGS. 23-24). One of the objectives for retaining the lobes 350, 352 against the rear doors 330, 332 or mounting frame upon deflation is to ensure that the lobes 350, 352 do not inhibit the operator from access when loading or unloading the trailer 318, and are not subjected to excessive wear. The battens 400 can include a radius of curvature 401 to match the profile of exterior faces 366, 367. The battens 400 can be placed within pockets 402 of the fabric that bridge across gaps formed when evacuating such that the semi-rigid member 400 forces the fabric to fold to specific desired locations in the deflated position to cause a significantly flatter profile against the trailer rear doors. The vacuum created in the triangular cross-section uses the battens 400 to prevent the exterior faces 366, 367 of the boattail legs 356, 357 from bending. This forces a controlled pre-determined folding sequence (refer to FIG. 25A-25D) to fold the boattail fabric inboard and flat against the rear face of the trailer door.

The outboard surfaces 364, 365 of the top portions 354, 355, proximal to the terminal edges 360, 362 can include a recessed area extending below the top edge 326 of the vehicle rear end. The recessed area 370, 372 can provide an unobstructed view of the vehicle's tail lights 371.

Each lobe 50, 52, 350, 352 can comprise a fully enclosed and airtight bag mounted onto a respective rear door of the trailer. In operation, the ADS, in the first position, feeds or blows air into each bag to provide inflation pressure to a level automatically pre-determined from about 0.10 PSI to about 0.80 PSI. The lobes, in conjunction with the ADS, can trap the air and hold the associated pressure without having to continually add air which minimizes ongoing energy required to maintain the inflated profile. In the second position, the ADS creates a vacuum using the same duct/hoses to suck or extract air out of the bags and functions to draw the bags substantially flat against the rear doors. The valve position selection can serve to trap and maintain the vacuum (i.e., negative pressure of about 0.00 to about −0.80 PSI) in the bag. As described above, the deflated position can be maintained while the tractor trailer is in motion at low speeds since the ADS features an automated system that can determine that motion is occurring and when the trailer is stopped, which then facilitates full opening and latching of each pivoting rear door to an opposing side of the trailer while the trailer cargo is loaded/unloaded.

Figure 26:
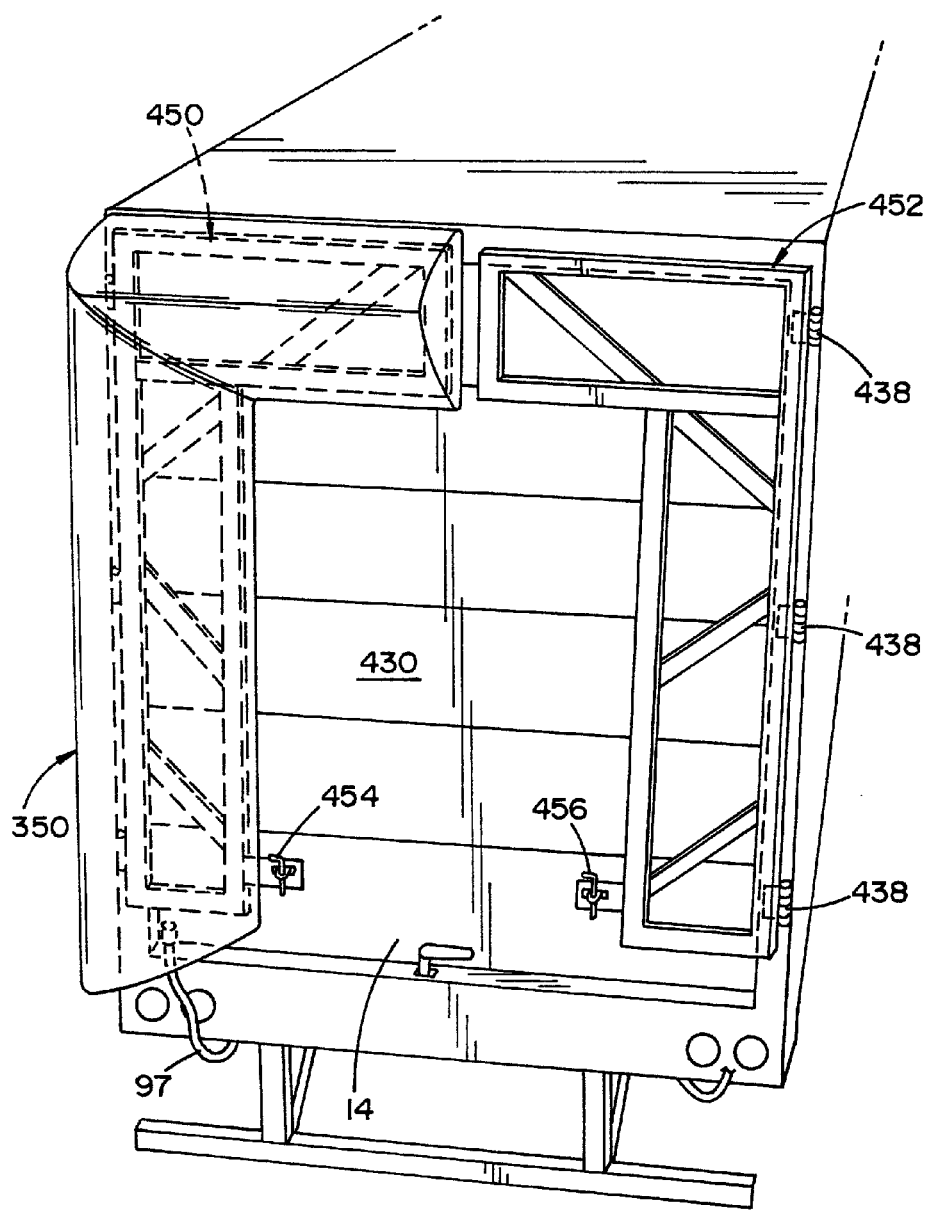
FIG. 26 is an alternative mounting arrangement for mounting the lobe(s) to the rear of he trailer; and, FIG. 27 is a chart displaying wind tunnel test results showing the percent improvement in fuel efficiencies at different speeds (mph) for different types/sizes of boattails and other drag reducing equipment.

It is to be appreciated that the lobes can be retained on, and deployed from, a trailer framing structure 450, 452 (FIG. 26). The trailer frame structure 450, 452 can provide a securing structure around a majority of the perimeter of the vehicle rear end to retain the respective inflated/deflated lobes thereon. The inflatable lobes can be held to the frames using a similar "c" channel arrangement as described above. The frames 450, 452 can be secured in the driving mode with latch pins 454, 456 mounted to roll-up door 430. The frames 450, 452 are rotatable about hinges 438 and can be secured to the trailer sides using a matching pin attached to the trailer side frame (not illustrated) for access to and unloading of the trailer contents. The aforementioned allows the rotating frames to be actuated for access to single roll-up doors. Alternatively the lobes can be pulled into (and deployed from) a surrounding trailer frame (not illustrated).

The manually operated ADS system cycle can start when the inflate switch or a remote is held in the 'auto inflate' position. For the automatic ADS system version, the electronic logic can receive vehicle speed, lobe pressure, and ambient temperature. The GPS unit 205 can also receive speed and altitude, which can be used to automatically start the inflation cycle at pre-programmed or predetermined speed and time intervals. The lobes can fill to full pressure within a designated period of time. In one example, the lobes can fill in about 1 to 5 minutes. If using a pressure transducer input 206, the electronic control can automatically cease inflation at a predetermined pressure such as 4 to 12 inches water column H2O. After inflation, the blower 201A can stop automatically. If the lobe pressure decreases or increases, while the trailer is in motion from normal air loss or from changing altitudes the automatic control's pressure input will provide continuous monitoring and will restart the blower 201A automatically and refill air into the lobe or lobes. Using the GPS system 205 the pressure can be adjusted to varying altitudes for optimum pressure. If the pressure decrease is due to a leak and the leak is large enough that the blower 201A runs for an excessive period of time, i.e. greater than 4 minutes and/or restarts repeatedly, then an alarm algorithm will result including an indication such as LED, lamp, sound, and/or other system alarm status. The system can also go to an automatic deflation and shut down cycle. The alarm light can be installed on the rear of the ADS enclosure, proximal to the rear, of the trailer, or other location viewable by the driver, providing function alerts to the driver or other wireless communication to the tractor cab. The internal ADS micro electronics can self monitor/watchdog itself, verify battery charger, transducer pressure 206 and all general system health as well as the presence or lack of the 12V DC from the trailer. For example, a variety of indications for normal system status, alarm, loss of GPS signal can be provided using the electronic or micro computer chip logic. Indication choices can include from one to three lights or various light indication patterns such as: Normal, Alarm for malfunctions, loss of Satellite to GPS, and loss of input voltage source etc. The alarm indication may indicate to the driver that maintenance is necessary. In addition, the onboard electronics may store alarm events type and date stamp for future troubleshooting.

The driver, at the point of alarm indication, if stopped or while driving can pull over to the side of the road when convenient and inspect the ADS 200 and the lobes. A leaking lobe can be temporarily repaired using a repair kit (not illustrated). To reset the electrical system, the on-off switch is cycled or a reset button or toggle switch can be utilized. If not repairable, the lobe can be manually deflated and then fastened substantially flat against the associated door using, for example, ties or straps wrapped around the lobe (not illustrated). The driver can then continue the trip with a secured and deflated lobe.

To operate the deflate cycle, the rear doors, or door, would be in the closed and secured orientation. The deflate cycle will start when the deflate switch or remote is operated to the 'deflate' position. The lobes will deflate and shut off automatically in a predetermined amount of time, i.e. approximately 1 to 5 minutes. Alternatively with the fully automated ADS use of preprogrammed speed and time algorithms can automatically commence a deflate cycle. In either system a pressure transducer or electronic chip can be used for sensing the internal pressure within the lobe or lobes. The inside pressure of the lobes are measured to stop the deflation cycle at a pre-set negative pressure level. The sensor can trigger the electronic programmed logic to close the valve and shut off the blower when a predetermined pressure is reached. For example, during the deflation cycle, the blower can stop when the desired pressure is reached, i.e. from about (−0.01) psi to about (−0.4) psi. The vacuum created in the deflate cycle holds or retains the lobe substantially flat against the door to resist flailing while the vehicle is in motion or if the battens 400 are employed to cause a controlled folding of the fabric to the rear of the trailer. It is to be appreciated that for the fully automated ADS with GPS 205, the deflate cycle can be initiated prior to parking the vehicle, at pre-programmed lower speeds, after the vehicle has stopped, and/or immediately initiated if any rearward motion is detected. The aforementioned uses the GPS or the trailer's ABS (Antilock Braking System control) communication without requiring any additional vehicle sensors or connections. The vacuum state mitigates the situation where the deflated lobe is subjected to extreme crosswinds while the vehicle is in motion at low speeds or while maneuvering in parking lots, docks or city streets etc. Once the vehicle has been parked and the lobes have been fully deflated, the doors can be opened and swung all the way around to the respective sides of the trailer.

As one illustrative example of the inflation/deflation process and the ADS 200 mechanism, the following is provided. In an autonomous operational arrangement, the ADS 200 can sense the forward speed sensor mechanism, via on board GPS 205 that initiates inflation after the vehicle has obtained a predetermined or set speed for a predeterminable or set period of time. One set of parameters can include a set or threshold speed of 25 mph, or more, for a continuous period of at least 2 minutes, for example. The cycle for inflation can then initiate once the set speed and set period have been reached. The pre-program can also incorporate more than one set point such as at a speed of 50 mph wherein the system is immediately inflated without any delay. Similarly, the ADS 200 can include a forward speed sensor mechanism, and rearward sensor, or GPS 205 that can do both, for initiating deflation after the vehicle's speed has declined to a predetermined or set speed for a predeterminable or set period of time. One set of parameters can include a set speed of 0-20 mph, or less, for a continuous period of 0.5-6.0 minutes, for example. The cycle for deflation can then initiate once the set speed and set period have been reached. Alternatively, if rearward movement has been detected, via GPS 205 or the wheel sensor, for example, then deflation can also be initiated without delay. In this operational arrangement, the ADS 200 functions autonomously without any intervention necessary from the driver. It is to be appreciated that other initiation parameters for inflation and deflation can be predetermined and programmed into the ADS 200.

The ADS can include motorized, solenoid actuated or pneumatic assisted valves i.e. spool valves, ball check, solenoid operated, or multi-way ball valves wherein the valves are positioned to allow air to pass through the tubes in a first direction for inflation of the lobes. A second position scheme to seal and hold pressure allowing the blower to be shut off and finally a third position scheme to allow air to pass through the tubes in a second direction for deflation of the lobes which can be followed back to the second position to hold a vacuum on the lobe assembly. In connection with displacement of inflatable lobes from the deflated to the deployed position thereof as described above, the motor blows air into the associated tubes whereby the air passes into the lobes. Alternatively there can be a dedicated inflate blower and valve to hold pressure and a second deflate blower and valve to deflate and create a vacuum in the lobe or lobes. If either lobe, or the single lobe, should suffer a leak, the ADS system will automatically detect the pressure drop and feed air into the system and thus maintain pressure to within a pre-determined range to maintain proper lobe characteristics. Alternative inflation means can be employed such as tapping into a compressed air source currently available on many tractor trailers for actuating valves and using injectors to draw ambient air into the lobes for inflation/deflation.

While considerable emphasis has been placed herein on the structures and structural interrelationships between the component parts of the embodiments discussed in the disclosure, it will be appreciated that many embodiments can be made and that many changes can be made in the embodiments herein illustrated and described without departing from the principles of the disclosure. In this respect, for example, it will be appreciated that other motor or solenoid actuated driven arrangements can be provided for displacing the inflatable lobe between the deflated and deployed positions thereof. These and other modifications of the disclosed embodiments as well as other embodiments of the disclosure will be suggested and obvious to those skilled in the art, whereby it is to be distinctly understood that the foregoing descriptive matter is to be interpreted merely as illustrative of the disclosure and not as a limitation.

The invention claimed is:

1. A drag reducing apparatus for a vehicle rear end, comprising:
    a first lobe and a second lobe wherein said lobes are inflatable;
    each said lobe including a top portion and a leg portion wherein said top portion is integral with said leg portion;
    said top portion and said leg portion intersect at a joint and form a generally right angle therebetween;
    each said lobe includes a mounting surface proximal to the vehicle rear end;
    each said lobe having a deflated non-deployed position and an inflated deployed position relative to the vehicle rear end;
    each said lobe includes a profile having a cross sectional three sided shape;
    each said leg portion of each said lobe extending along a majority of a height of the vehicle rear end and each said top portion of each said lobe extending along generally half the width of the vehicle rear end;
    said profile includes an aft edge along each said lobe wherein said aft edge extends from about 20 inches to about 46 inches rearward from the vehicle rear end;
    wherein said first lobe is mounted to a first mounting frame and said second lobe is mounted to a second mounting frame; and,
    said first mounting frame and said second mounting frame hingedly retained to opposing sides of the vehicle rear end.

2. A drag reducing apparatus for a vehicle rear end, comprising:
    a first lobe and a second lobe wherein said lobes are inflatable;
    each said lobe including a top portion and a leg portion;
    said top portion and said leg portion intersect at a joint and form a generally right angle therebetween;
    each said lobe includes a mounting surface proximal to the vehicle rear end;
    each said lobe having a deflated non-deployed position and an inflated deployed position relative to the vehicle rear end;
    each said lobe includes a profile having a cross sectional three sided shape;
    each said leg portion of each said lobe extending along a majority of a height of the vehicle rear end and each said top portion of each said lobe extending along generally half the width of the vehicle rear end;
    said profile includes an aft edge along each said lobe wherein said aft edge extends from about 20 inches to about 46 inches rearward from the vehicle rear end; and,
    said drag reducing apparatus further including a vacuum mechanism on said vehicle for deflating said lobes and holding said lobes in a vacuum state against the vehicle rear end thereby restricting movement of said lobes relative to said mounting surface in said deflated position;
    wherein said first lobe and said second lobe each include at least one pocket adjacent to an exterior surface of the respective leg portions;
    said at least one pocket of each said lobe includes a semi-rigid batten therein; and,
    each said batten stiffens each respective said exterior surface for controlling a pre-determined folding sequence of each respective said lobe during said deflating of said lobes.

3. The apparatus according to claim 2, wherein each said batten includes a curvilinear side; and,
    said curvilinear side is contiguous with said exterior surface of the respective leg portion of each said lobe.

4. A drag reducing apparatus for a vehicle rear end, comprising:
    a first lobe and a second lobe wherein said lobes are inflatable;
    each said lobe including a top portion and a leg portion wherein said top portion is integral with said leg portion;
    said top portion and said leg portion intersect at a joint and form a generally right angle therebetween;
    each said lobe includes a mounting surface proximal to the vehicle rear end;
    each said lobe having a deflated non-deployed position and an inflated deployed position relative to the vehicle rear end;
    each said lobe includes a profile having a cross sectional three sided shape;
    each said leg portion of each said lobe extending along a majority of a height of the vehicle rear end and each said top portion of each said lobe extending along generally half the width of the vehicle rear end;
    said profile includes an aft edge along each said lobe wherein said aft edge extends from about 20 inches to about 46 inches rearward from the vehicle rear end;

wherein the vehicle rear end includes a perimeter having a peripheral frame around a majority of said perimeter; and, said peripheral frame includes a cavity for storing and retaining said lobes while in the deflated position.

5. An inflatable drag reducer adapted to be mounted on a rear end of a vehicle transport trailer, said drag reducer comprising:

a first lobe and a second lobe wherein each said lobe including a top portion and a leg portion wherein said top portion is integral with said leg portion;

each said top portion and said leg portion intersect at a joint and form a generally right angle therebetween proximal to opposing top corners of the rear end of the vehicle;

each said lobe includes a mounting surface proximal to the vehicle rear end, wherein said mounting surface includes an area;

each said lobe having a non-deployed deflated position and a deployed inflated position relative to the vehicle rear end;

each said leg portion of each said lobe extending along a majority of a height of the vehicle rear end;

the vehicle rear end includes an area, wherein a combined said mounting surface area of said first lobe and said second lobe include a collar shape comprising from about 20 percent to about 65 percent of the area of the vehicle rear end;

wherein said first lobe is mounted to a first mounting frame and said second lobe is mounted to a second mounting frame; and, said first mounting frame and said second mounting frame hingedly retained to opposing sides of the vehicle rear end.

6. An inflatable drag reducer adapted to be mounted on a rear end of a vehicle transport trailer, said drag reducer comprising:

a first lobe and a second lobe wherein each said lobe including a top portion and a leg portion wherein said top portion is integral with said leg portion;

each said top portion and said leg portion intersect at a joint and form a generally right angle therebetween proximal to opposing top corners of the rear end of the vehicle;

each said lobe includes a mounting surface proximal to the vehicle rear end, wherein said mounting surface includes an area;

each said lobe is self-contained and comprises air tight and flexible material;

each said lobe having a non-deployed deflated position and a deployed inflated position relative to the vehicle rear end;

each said leg portion of each said lobe extending along a majority of a height of the vehicle rear end; and, the vehicle rear end includes an area, wherein a combined said mounting surface area of said first lobe and said second lobe include a collar shape comprising from about 20 percent to about 65 percent of the area of the vehicle rear end;

wherein said first lobe and said second lobe each include at least one pocket adjacent to an exterior surface of the respective leg portions;

said at least one pocket of each said lobe includes a semi-rigid batten therein; and, each said batten stiffens each respective said exterior surface for controlling a pre-determined folding sequence of each respective said lobe during said deflating of said lobes.

7. A drag reducing apparatus for a vehicle, comprising:

at least one lobe wherein said at least one lobe is inflatable;

said at least one lobe includes a mounting surface adjacent to a vehicle exterior surface;

said at least one lobe having a deflated non-deployed position and an inflated deployed position relative to the vehicle exterior surface;

said at least one lobe is self-contained and comprises air tight material;

said drag reducing apparatus further including a vacuum mechanism on the vehicle for deflating said at least one lobe and holding said at least one lobe in a negative pressure state against the vehicle exterior surface; and, said vacuum mechanism measures an internal pressure of said at least one lobe and stops said deflation at a predeterminable pressure level thereby restricting movement of said at least one lobe relative to said mounting surface in said deflated position.

8. The apparatus according to claim 7, wherein said negative pressure is from about −0.10 PSI to about −0.80 PSI.

9. The apparatus according to claim 8, further including at least another lobe; and, said at least another lobe having a deflated non-deployed position and an inflated deployed position relative to the vehicle exterior surface.

10. The apparatus according to claim 9, wherein said lobes form a generally collar shape around the top, the sides, and a portion of a bottom of the vehicle rear end.

11. An inflatable drag reducer adapted to be mounted to a vehicle transport trailer, said drag reducer comprising:

a first lobe and a second lobe wherein each said lobe is self-contained;

each said lobe having a non-deployed deflated position and a deployed inflated position relative to the vehicle rear end;

each said lobe includes a mounting surface proximal to the vehicle rear end;

wherein said initiation of said inflation and said deflation are selectively determinable based on variables of a predeterminable speed, a direction, and a predeterminable duration of time, respectively, above and below said predeterminable speed; and, wherein said deflation is initiated immediately upon detection of a reverse direction.

12. The drag reducer of claim 11, wherein said inflation and said deflation are autonomously initiated based on said variables.

13. An inflatable drag reducer adapted to be mounted on a rear end of a vehicle transport trailer, said drag reducer comprising:

at least a first lobe;

said at least first lobe includes a mounting surface proximal to the rear end of the vehicle transport trailer;

said at least first lobe is self-contained;

said at least first lobe having a non-deployed deflated position and a deployed inflated position relative to the rear end of the vehicle transport trailer;

wherein said at least first lobe includes at least one pocket adjacent to an exterior surface;

said at least one pocket of said at least first lobe includes a semi-rigid batten therein; and, said batten stiffens said exterior surface for controlling a pre-determined folding sequence of said at least first lobe during said deflating of said at least first lobe.

14. The drag reducer according to claim 13, wherein said batten includes a curvilinear side; and, said curvilinear side is contiguous with said exterior surface of said at least first lobe.

* * * * *

UNITED STATES PATENT AND TRADEMARK OFFICE
CERTIFICATE OF CORRECTION

PATENT NO. : 8,444,210 B2  
APPLICATION NO. : 12/886756  
DATED : May 21, 2013  
INVENTOR(S) : James Francis Domo and Patrick Edward Ryan It is certified that error appears in the above-identified patent and that said Letters Patent is hereby corrected as shown below:

Title Page, (73) Assignee, should read as follows:  
-- (73) Assignee: Aerodynamic Trailer Systems, Ltd.,  
Aurora, Ohio --

Signed and Sealed this  
Fourteenth Day of April, 2015

Michelle K. Lee  
*Director of the United States Patent and Trademark Office*